United States Patent
Han et al.

(10) Patent No.: US 9,146,436 B2
(45) Date of Patent: Sep. 29, 2015

(54) LIQUID CRYSTAL PANEL

(71) Applicant: SHENZHEN CHINA STAR OPTOELECTRONICS TECHNOLOGY CO., LTD., Shenzhen (CN)

(72) Inventors: Bing Han, Shenzhen (CN); Jin Jie Wang, Shenzhen (CN)

(73) Assignee: SHENZHEN CHINA STAR OPTOELECTRONICS TECHNOLOGY CO. LTD., Shenzhen (CN)

( * ) Notice: Subject to any disclaimer, the term of this patent is extended or adjusted under 35 U.S.C. 154(b) by 133 days.

(21) Appl. No.: 14/234,394

(22) PCT Filed: Jan. 7, 2014

(86) PCT No.: PCT/CN2014/070203
§ 371 (c)(1),
(2) Date: Jan. 23, 2014

(87) PCT Pub. No.: WO2015/096203
PCT Pub. Date: Jul. 2, 2015

(65) Prior Publication Data
US 2015/0185572 A1    Jul. 2, 2015

(51) Int. Cl.
G02F 1/1362 (2006.01)
G02F 1/1333 (2006.01)
G02F 1/1335 (2006.01)
G02F 1/1368 (2006.01)

(52) U.S. Cl.
CPC ........ *G02F 1/136286* (2013.01); *G02F 1/1368* (2013.01); *G02F 1/133345* (2013.01); *G02F 1/133514* (2013.01)

(58) Field of Classification Search
CPC .............. H01L 27/124; H01L 27/3276; H01L 27/3279; H01L 29/66765; H01L 29/41733; H01L 29/4908; H01L 29/78669; H01L 29/458; H01L 29/786; H01L 29/78606; H01L 29/78678; H01L 33/42; H01L 51/102; H01L 23/5329; G02F 1/1362; G02F 1/136204; G02F 1/136286; G02F 1/1368; G02F 1/136227; G02F 1/133512; G02F 1/13439; G02F 1/133514; G02F 1/134336; G02F 1/1333; G02F 1/133345; G02F 1/136209; G02F 1/1343; G02F 1/134309; G02F 2001/13629; G02F 1/136295; G09G 3/3648; G09G 3/3688; G09G 2300/0426; G09G 2300/043; G09G 2320/0209; G09G 2320/0257; G01T 1/241
USPC .......... 257/72, 59, E29.273; 349/43, 46, 106, 349/42, 138, 110, 139, 108, 143, 158; 438/158; 345/92, 214, 88
See application file for complete search history.

(56) References Cited

U.S. PATENT DOCUMENTS

2011/0013106 A1*    1/2011    Liu ................................. 349/46

* cited by examiner

*Primary Examiner* — Thoi Duong
(74) *Attorney, Agent, or Firm* — Mark M Friedman (57) ABSTRACT

The present invention provides a liquid crystal panel which has a plurality of data lines, a plurality of scan lines and a plurality of display units. Each of the scan lines has a second metal wiring layer, a third metal wiring layer located above the second metal wiring layer, and two transparent conductive lines. The transparent conductive lines are spaced apart from each other and located between the second and third metal wiring layers. The second and third metal wiring layers can form a parallel connection by electrically connecting the second metal wiring layer with the third metal wiring layer, so that the impedance of the scan lines can be reduced.

14 Claims, 6 Drawing Sheets

Fig.8

LIQUID CRYSTAL PANEL

FIELD OF THE INVENTION

The present invention relates to a liquid crystal panel, and more particularly to a liquid crystal panel for improving the quality of the display of the panel.

BACKGROUND OF THE INVENTION

Recently, with the development of semiconductor technology and manufacturing art, thin film transistor liquid crystal display (TFT-LCD) has the features of higher quality, lower power consumption, less radiation, and smaller size so it is gradually becoming a mainstream product in the market. An LCD panel generally comprises an array substrate of thin film transistors, a color filter substrate, and a layer of liquid crystal material between the thin film transistor array substrate and the color filter substrate. A plurality of scan lines are vertically interlaced with a plurality of data lines on the array substrate which delimits a plurality of pixel areas, and a plurality of pixel driving circuits driving the pixels. Wherein the color filter substrate is a transparent glass substrate, a transparent conductive film formed on the thereof by sputtering of indium-tin oxide (ITO) or indium zinc oxide (IZO). The transparent conductive film electrically connects a power source of the common electrode and the corresponding pixel electrode provided on the array substrate to produce a predetermined voltage in order to control the twist of the LCD panel.

Figure 1:
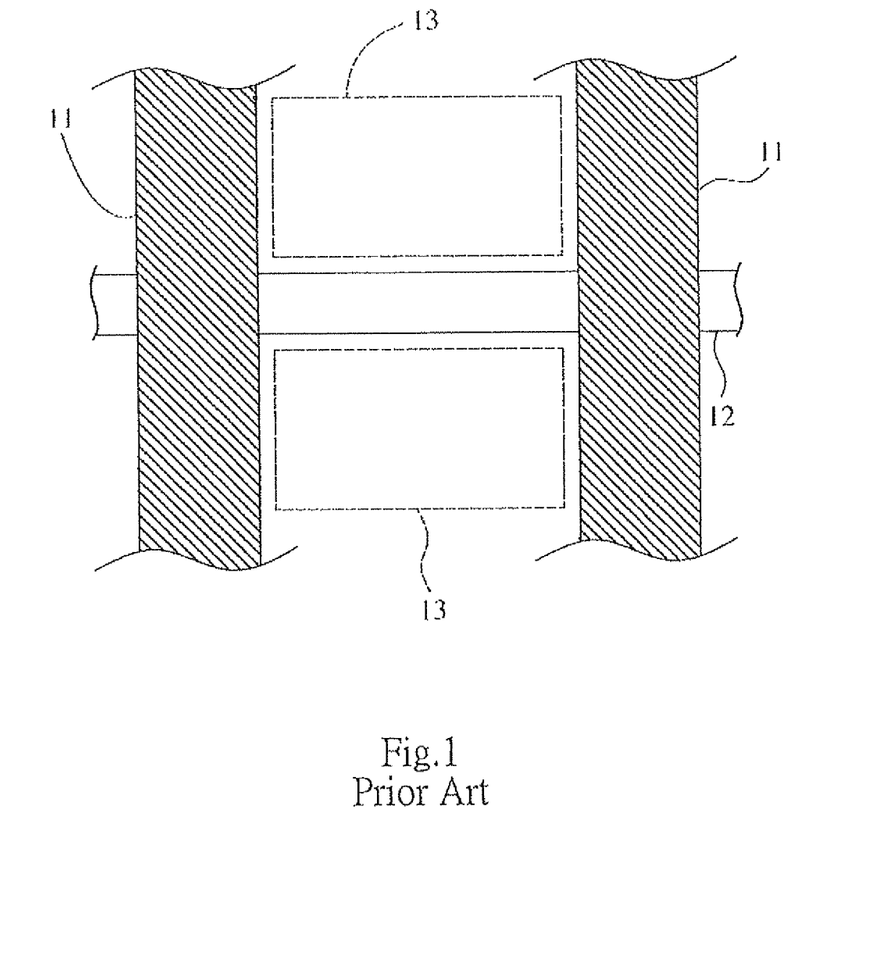
FIG. 1 is a schematic view of a traditional LCD panel.
Figure 2:
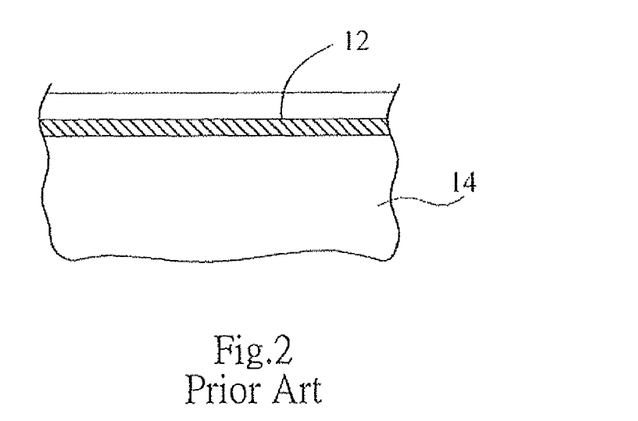
FIG. 2 is a cross-sectional view of the LCD panel according to a scan line in FIG. 1.
Figure 3:
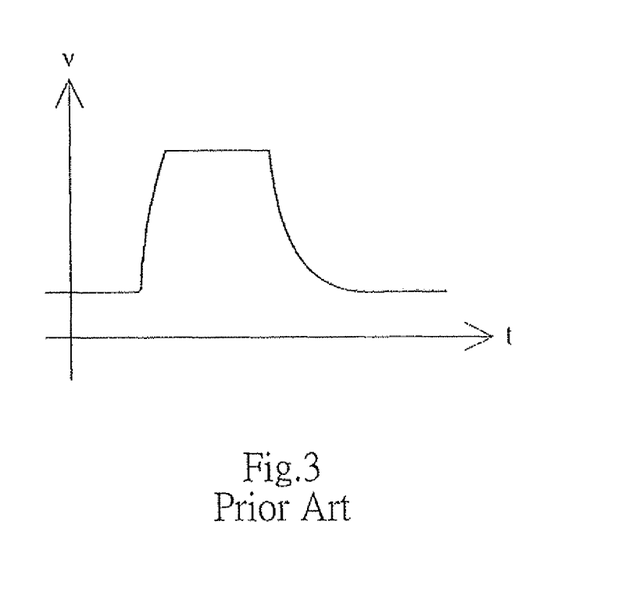
FIG. 3 is a schematic view of a waveform signal of a gate of the traditional LCD panel.

Referring to FIGS. 1 and 2, a traditional LCD panel is disclosed and comprises a plurality of data lines, a plurality of scan lines, and a plurality of pixel driving circuits. In FIG. 1, two data lines 11 and a scan line 12 are shown for illustration. The scan line 12 is vertically interlaced with the data lines 11 on an array substrate 14 and the pixel driving circuits 13 are disposed between the corresponding scan line 12 and the corresponding data line 11. The data lines 11 and scan lines 12 are generally made of a single metal in order to vertically align, since the impedance of the metal line is inversely proportional to the thickness of the thereof, and the impedance of a single metal is higher. Referring to FIG. 3, the impedance of the scan line 12 is too high thus resulting in the delay of the signal of a gate. This produces problems of wrong charge, crosstalk and fan-out mura. Even if the impedance of the scan line 12 is reduced by increasing the width of the line or by increasing the thickness of the line to solve the problems, which lead to the increase of the capacitance value or the process becomes more difficult and more line material is wasted. Therefore, these problems still cannot be solved,

SUMMARY OF THE INVENTION

In view of this, the present invention provides a liquid crystal panel which is used to solve the problems caused by the large impedance of the scan lines, namely wrong charge, crosstalk, and fan-out mura.

A primary object of the present invention is to provide an LCD panel by electrically connecting the second metal wiring layer with the third metal wiring layer to reduce the impedance of the scan lines.

A secondary object of the present invention is to provide an LCD panel by electrically connecting the second metal wiring layer with the third metal wiring layer to solve the problems of wrong charge, crosstalk, and fan-out mura.

To achieve the above objects, the present invention provides a liquid crystal panel which comprises an array substrate of thin film transistor, a color filter substrate, and a layer of liquid crystal material between the thin film transistor array substrate and the color filter substrate, wherein a surface of the array substrate close to the layer of liquid crystal material comprises a plurality of data lines, a plurality of scan lines and a plurality of display units, each of the data lines has a first metal wiring layer, the scan lines are vertically interlaced with the data lines, and each of the scan lines has: a second metal wiring layer interlaced with the first metal wiring layer, a third metal wiring layer located above the second metal wiring layer, and two transparent conductive lines spaced apart from each other and located between the second metal wiring layer and the third metal wiring layer, wherein one of the transparent conductive lines electrically connects the second metal wiring layer to a front end of the third metal wiring layer, and the other thereof electrically connects the second metal wiring layer to a rear end of the third metal wiring layer, each of the data lines electrically connects to the corresponding data line and the corresponding scan line, wherein the first metal wiring layer and the third metal wiring layer are made of the same metal, and the second metal wiring layer is made of a metal different therefrom.

In one embodiment of the present invention, each of the transparent conductive lines comprises: an inner portion away from the corresponding data line, and an outer portion close to the corresponding data line.

In one embodiment of the present invention, the liquid crystal panel further comprises: a first insulating layer formed on the second metal wiring layer, a lower through hole formed in the first insulating layer and connected the second metal wiring layer to the outer portion of the transparent conductive line, a second insulating layer formed on the first insulating layer and covered on the transparent conductive lines, and an upper through hole formed in the second insulating layer and connected the inner portion of the transparent conductive line to the third metal wiring layer.

In one embodiment of the present invention, the first, second and third metal wiring layers are selected respectively from chromium (Cr), molybdenum (Mo) or Cr—Mo alloys.

Moreover, to achieve the above objects, the present invention provides a liquid crystal panel which comprises an array substrate of thin film transistor, a color filter substrate, and a layer of liquid crystal material between the thin film transistor array substrate and the color filter substrate, wherein a surface of the array substrate close to the layer of liquid crystal material comprises a plurality of data lines, a plurality of scan lines and a plurality of display units, each of the data lines has a first metal wiring layer, the scan lines are vertically interlaced with the data lines, and each of the scan lines has: a second metal wiring layer interlaced with the first metal wiring layer, a third metal wiring layer located above the second metal wiring layer, and two transparent conductive lines spaced apart from each other and located between the second metal wiring layer and the third metal wiring layer, wherein one of the transparent conductive lines electrically connects the second metal wiring layer to a front end of the third metal wiring layer, and the other thereof electrically connects the second metal wiring layer to a rear end of the third metal wiring layer, each of the display units electrically connects to the corresponding data line and the corresponding scan line.

In one embodiment of the present invention, each of the transparent conductive lines comprises: an inner portion away from the corresponding data line, and an outer portion close to the corresponding data line.

In one embodiment of the present invention, the liquid crystal panel further comprises: a first insulating layer formed on the second metal wiring layer, a lower through hole formed in the first insulating layer and connected the second metal wiring layer to the outer portion of the transparent conductive line, a second insulating layer formed on the first insulating layer and covered on the transparent conductive lines, and an upper through hole formed in the second insulating layer and connected the inner portion of the transparent conductive line to the third metal wiring layer.

In one embodiment of the present invention, the first metal wiring layer and the third metal wiring layer are made of the same metal, and the second metal wiring layer is made of a metal different therefrom.

In one embodiment of the present invention, the first, second and third metal wiring layers are selected respectively from chromium (Cr), molybdenum (Mo) or Cr—Mo alloys.

Moreover, to achieve the above objects, the present invention provides a liquid crystal panel which comprises a plurality of data lines, a plurality of scan lines and a plurality of display units, wherein each of the data lines has a first metal wiring layer, the scan lines are vertically interlaced with the data lines, and each of the scan lines comprises: a second metal wiring layer interlaced with the first metal wiring layer, a third metal wiring layer located above the second metal wiring layer, and a single transparent conductive line spaced apart from each other and located between the second metal wiring layer and the third metal wiring layer, wherein an end of the transparent conductive line electrically connects the second metal wiring layer to a front end of the third metal wiring layer, and the other end of the transparent conductive line electrically connects the second metal wiring layer to a rear end of the third metal wiring layer, each of the display units electrically connects to the corresponding data line and the corresponding scan line.

In one embodiment of the present invention, a length of the transparent conductive line is greater than that of the third metal wiring layer.

In one embodiment of the present invention, the transparent conductive line has a front portion and a rear portion, the front portion and the rear portion are close to two of the adjacent data lines, respectively, each of the front portion and the rear portion forms an upper through hole and a lower through hole, respectively, the upper through hole electrically connects to the third metal wiring layer, and the lower through hole electrically connects to the second metal wiring layer.

In one embodiment of the present invention, the liquid crystal panel further comprises: a first insulating layer formed on the second metal wiring layer; a pair of lower through holes formed in the first insulating layer and connected the second metal wiring layer to the front portion and the rear portion of the transparent conductive line, respectively; a second insulating layer formed on the first insulating layer and covered on the transparent conductive lines; and a pair of upper through holes formed in the second insulating layer and connected the front portion and the rear portion of the transparent conductive line to the third metal wiring layer, respectively.

In one embodiment of the present invention, the first and third metal wiring layers are made of the same metal, and the second metal wiring layer is made of a metal different therefrom.

As stated above, the second and third metal wiring layers can form a parallel connection by electrically connecting the second metal wiring layer with the third metal wiring layer, so that the impedance of the scan lines can be reduced, and thereby solve the problems of wrong charge, crosstalk, and fan-out mura to improve the quality of the display of the panel. Otherwise, the transparent conductive lines are spaced apart from each other and located between the second and third metal wiring layers which can avoid the second and third metal wiring layers forming a short circuit,

DETAILED DESCRIPTION OF THE PREFERRED EMBODIMENTS

The structure and the technical means adopted by the present invention to achieve the above and other objects can be best understood by referring to the following detailed description of the preferred embodiments and the accompanying drawings. Furthermore, directional terms described by the present invention, such as upper, lower, front, back, left, right, inner, outer, side, longitudinal/vertical, transverse/horizontal, etc., are only directions by referring to the accompanying drawings, and thus the used directional terms are used to describe and understand the present invention, but the present invention is not limited thereto.

Figure 4:
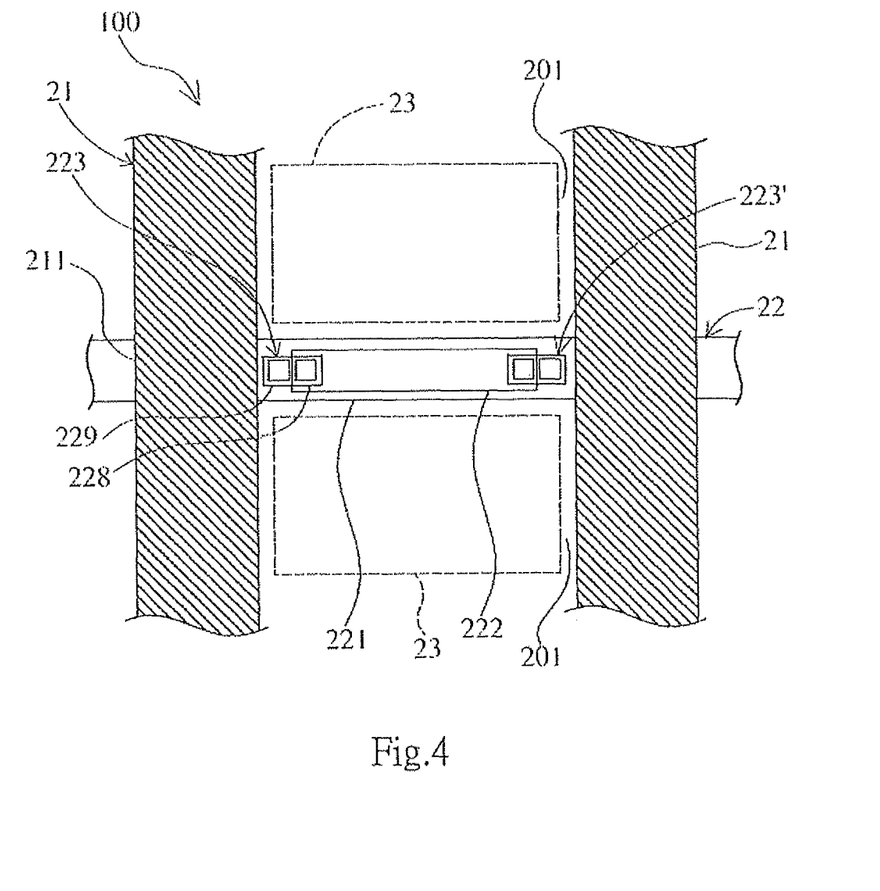
FIG. 4 is a schematic view of an LCD panel according to a first preferred embodiment of the present invention.
Figure 5:
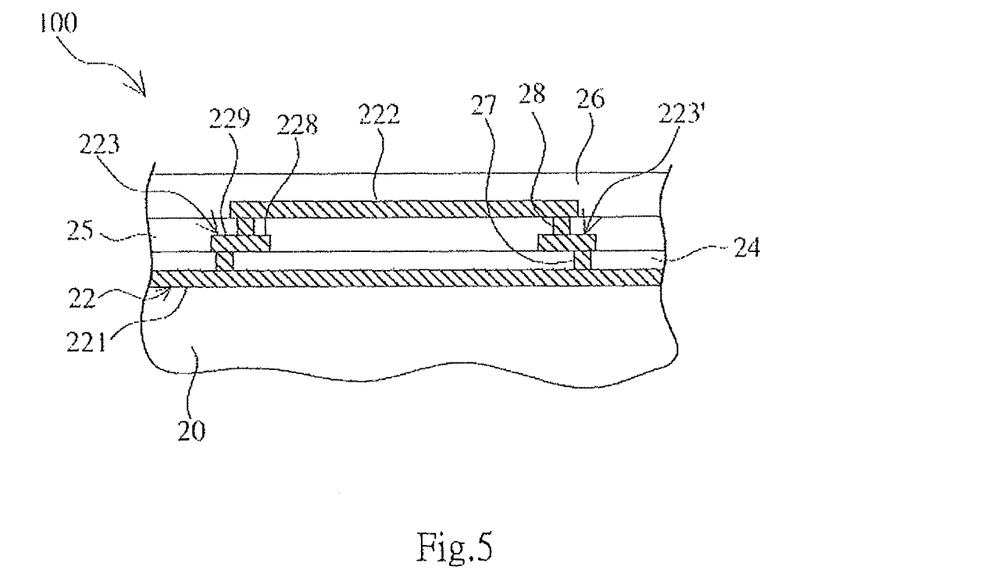
FIG. 5 is a cross-sectional view of the LCD panel according to a scan line in FIG. 4.
Figure 6:
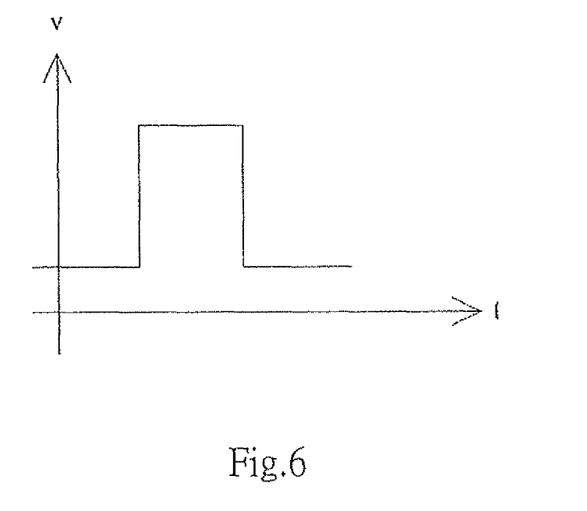
FIG. 6 is a schematic view of a waveform signal of a gate according to the first preferred embodiment of the present invention.

Referring to FIGS. 4 and 5, an LCD panel 100 according to a first preferred embodiment of the present invention is illustrated and comprises an array substrate of thin film transistor (TFT array substrate) 20, a color filter substrate (CF substrate, not shown), and a layer of liquid crystal material (not shown) between the thin film transistor array substrate and the color filter substrate, wherein a surface of the array substrate 20 close to the layer of liquid crystal material (inner surface) comprises a plurality of data lines 21, a plurality of scan lines 22, a plurality of display units 23, a first insulating layer 24, a second insulating layer 25, a third insulating layer 26, a plurality of lower through holes 27, and a plurality of upper through holes 28. In FIG. 4, two data lines 21 and a scan line 22 are shown on the array substrate 20 for illustration. The structures, installation relationships and operations of each of the above components according to the present invention will be described in detail as follows by the preferred embodiments and with FIGS. 4-6 hereinafter.

Referring to FIGS. 4 and 5, in the LCD panel 100 of the present invention, a photo-etching-process (PEP) is processed on the array substrate 20 to form the data lines 21 and scan lines 22, wherein the array substrate 20 has a plurality of pixel areas 201.

Referring still to FIGS. 4 and 5, each of the data lines 21 has a first metal wiring layer 211, the scan lines 22 vertically interlaced with the data lines 21, each of the scan lines 22 has a second metal wiring layer 221, a third metal wiring layer 222, and two transparent conductive lines 223 and 223', the second metal wiring layer 221 is interlaced with the first metal wiring layer 221, the third metal wiring layer 222 is located above the second metal wiring layer 221, the transparent conductive lines 223 and 223' are spaced apart from each other and located between the second metal wiring layer 221 and the third metal wiring layer 222. In the preferred embodiment, the first metal wiring layer 211 and the third metal wiring layer 222 are made of the same metal, the second metal wiring layer 221 is made of a metal different therefrom, and the first , second, and third metal wiring layers 211, 221 and 222 are selected respectively from chromium (Cr), molybdenum (Mo) or Cr—Mo alloys.

Referring still to FIGS. 4 and 5, each of the transparent conductive lines 223 and 223' comprises an inner portion 228 and an outer portion 229. The inner portion 228 is away from the corresponding data line 21, and the outer portion 229 is close to the corresponding data line 21. One of the transparent conductive lines 223 electrically connects the second metal wiring layer 221 to a front end of the third metal wiring layer 222, and the other transparent conductive line 223' electrically connects the second metal wiring layer to a rear end of the third metal wiring layer 222. In the preferred embodiment, the transparent conductive lines 223 and 223' are made of indium tin oxide (ITO).

Referring back to FIGS. 4 and 5, the first insulating layer 24 is formed on the second metal wiring layer 221, the lower through hole 27 is formed in the first insulating layer 24 and connects the second metal wiring layer 221 to the outer portion 229 of the transparent conductive lines 223 and 223'. The second insulating layer 25 is formed on the first insulating layer 24 and covered on the transparent conductive lines 223 and 223', the upper through hole 28 is formed in the second insulating layer 25 and connects the inner portion 228 of the transparent conductive lines 223 and 223' to the third metal wiring layer 222.

Referring still to FIGS. 4 and 5, each of the display units 23 electrically connects to the corresponding data line 21 and the corresponding scan line 22, and the display units 23 (e.g., a pixel driving circuit and a pixel electrode) are disposed in the corresponding pixel areas 201.

Referring still to FIGS. 4 and 5, the third metal wiring layer 222 is located above the second metal wiring layer 221, and the third metal wiring layer 222 and the second metal wiring layer 221 are electrically connect by the upper through hole 28 and the lower through hole 27 according to the above description. The second metal wiring layer 221 and the third metal wiring layer 222 can form a parallel connection, referring to FIGS. 6, so that the impedance of the scan lines can be reduced, and the delay of the signal of a gate can be avoided to solve the problem of wrong charge, crosstalk and fan-out mora and thus improve the quality of the display of the panel. Otherwise, the transparent conductive lines 223 and 223' are spaced apart from each other and located between the second and third metal wiring layers 221 and 222, so that it can avoid the second and third metal wiring layers 221 and 222 forming a short circuit.

Figure 7:
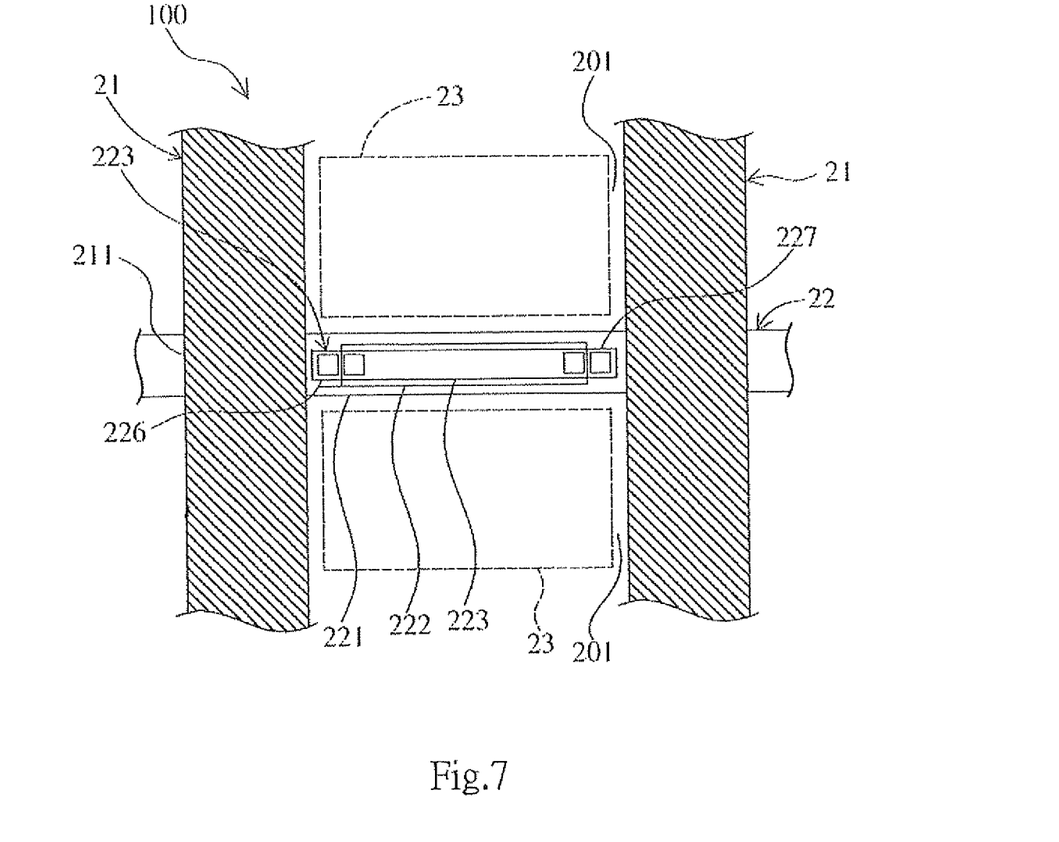
FIG. 7 is a schematic view of an LCD panel according to a second preferred embodiment of the present invention.
Figure 8:
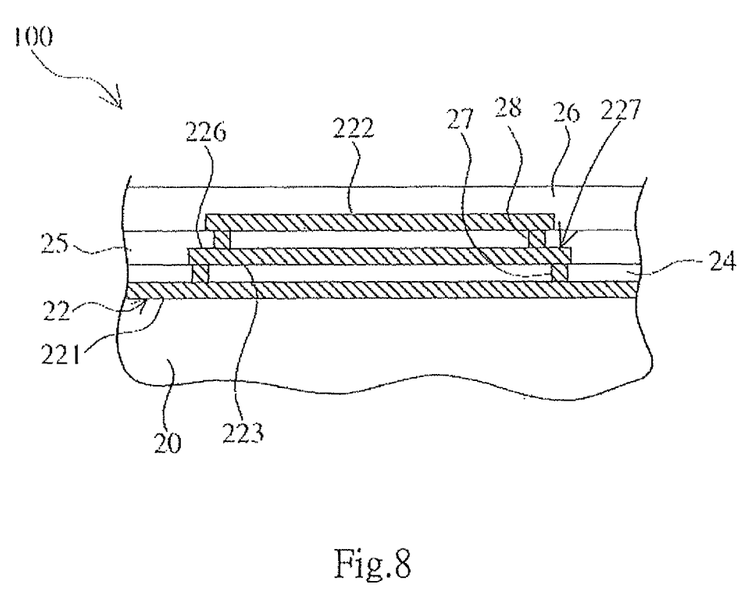
FIG. 8 is a cross-sectional view of the LCD panel according to a scan line in FIG. 7.

Referring to FIGS. 7 and 8, a semiconductor wafer 100 according to a second embodiment of the present invention is illustrated and similar to the first embodiment, so that the second embodiment uses similar terms or numerals of the first embodiment. As shown, the difference of the second embodiment is that each of the data lines 21 has a first metal wiring layer 211, and the scan lines 22 is vertically interlaced with the data lines 21, wherein each of the scan lines 22 comprises a second metal wiring layer 221, a third metal wiring layer 222 and a single transparent conductive line 223, wherein the second metal wiring layer 221 is interlaced with the first metal wiring layer 211, the third metal wiring layer 222 is located above the second metal wiring layer 221, and the single transparent conductive line 223 are spaced apart from each other and located between the second metal wiring layer 221 and the third metal wiring layer 222, an end of the transparent conductive line 223 electrically connects the second metal wiring layer 221 to a front end of the third metal wiring layer 222, and the other end of the transparent conductive line 223 electrically connects the second metal wiring layer 221 to a rear end of the third metal wiring layer 222.

Referring still to FIGS. 7 and 8, the transparent conductive line 223 has a front portion 226 and a rear portion 227, and the length of the transparent conductive line 223 is greater than that of the third metal wiring layer 222. The front portion 226 and the rear portion 227 are close to two of the adjacent data lines21, respectively, wherein each of the front portion 226 and the rear portion 227 forms an upper through hole 28 and a lower through hole 27, respectively, the upper through hole 28 electrically connects to the third metal wiring layer 222, and the lower through hole 27 electrically connects to the second metal wiring layer 221.

Referring back to FIGS. 7 and 8, each of display units 23 electrically connects to the corresponding data line 21 and the corresponding scan line 22, and the display units 23. In the preferred embodiment, the first and third metal wiring layers 211 and 222 are made of the same metal, and the second metal wiring layer 221 is made of a metal different therefrom, and the first, second, and third metal wiring layers 211, 221, and 222 are selected respectively from chromium (Cr), molybdenum (Mo) or Cr—Mo alloys.

Referring still to FIGS. 7 and 8, the liquid crystal panel 100 further comprises a first insulating layer 24, a pair of lower through holes 27, a second insulating layer 25, and a pair of upper through holes 28. The first insulating layer 24 is formed on the second metal wiring layer 221, and the lower through holes 27 is formed in the first insulating layer 24 and connects the second metal wiring layer 221 to the front portion 226 and the rear portion 227 of the transparent conductive line 223, respectively. The second insulating layer 25 is formed on the first insulating layer 24 and covered on the transparent conductive lines 223, and the upper through holes 28 are formed in the second insulating layer 25 and connect the front portion 226 and the rear portion 227 of the transparent conductive line 223 to the third metal wiring layer 222, respectively.

Referring still to FIGS. 7 and 8, the third metal wiring layer 222 is located above the second metal wiring layer 221, and the third metal wiring layer 222 and the second metal wiring layer 221 are electrically connect by the upper through hole 28 and the lower through hole 27 according to the above description. The second metal wiring layer 221 and the third metal wiring layer 222 can formed a parallel connection, so that the impedance of the scan lines can be reduced, and the delay of the signal of a gate can be avoided to solve the problems of wrong charge, crosstalk and fan-out mura and thus improve the quality of the display of the panel. Otherwise, the transparent conductive lines 223 and 223' are spaced apart from each other and located between the second and third metal wiring layers 221 and 222 which can avoid the second and third metal wiring layers 221 and 222 forming a short circuit.

The present invention has been described with a preferred embodiment thereof and it is understood that many changes and modifications to the described embodiment, can be carried out without departing from the scope and the spirit of the invention that is intended to be limited only by the appended claims.

What is claimed is:

1. A liquid crystal panel, comprising an array substrate of thin film transistor, a color filter substrate, and a layer of liquid crystal material between the thin film transistor array substrate and the color filter substrate, wherein a surface of the array substrate close to the layer of liquid crystal material comprises:
a plurality of data lines, each of which has a first metal wiring layer;
a plurality of scan lines vertically interlaced with the data lines, each of the scan lines having: a second metal wiring layer interlaced with the first metal wiring layer, a third metal wiring layer located above the second metal wiring layer, and two transparent conductive lines spaced apart from each other and located between the second metal wiring layer and the third metal wiring layer, wherein one of the transparent conductive lines electrically connects the second metal wiring layer to a front end of the third metal wiring layer, and the other thereof electrically connects the second metal wiring layer to a rear end of the third metal wiring layer; and
a plurality of display units, each of which electrically connects to the corresponding data line and the corresponding scan line;
wherein the first metal wiring layer and the third metal wiring layer are made of the same metal, and the second metal wiring layer is made of a metal different therefrom.

2. The liquid crystal panel according to claim 1, wherein each of the transparent conductive lines comprises: an inner portion away from the corresponding data line, and an outer portion close to the corresponding data line.

3. The liquid crystal panel according to claim 2, wherein the liquid crystal panel further comprises: a first insulating layer formed on the second metal wiring layer, a lower through hole formed in the first insulating layer and connected the second metal wiring layer to the outer portion of the transparent conductive line, a second insulating layer formed on the first insulating layer and covered on the transparent conductive lines, and an upper through hole formed in the second insulating layer and connected the inner portion of the transparent conductive line to the third metal wiring layer.

4. The liquid crystal panel according to claim 1, wherein the first, second, and third metal wiring layers are selected respectively from chromium (Cr), molybdenum (Mo) or Cr—Mo alloys.

5. A liquid crystal panel, comprising:
a plurality of data lines, each of which has a first metal wiring layer;
a plurality of scan lines vertically interlaced with the data lines, each of the scan lines having: a second metal wiring layer interlaced with the first metal wiring layer, a third metal wiring layer located above the second metal wiring layer, and two transparent conductive lines spaced apart from each other and located between the second metal wiring layer and the third metal wiring layer, wherein one of the transparent conductive lines electrically connects the second metal wiring layer to a front end of the third metal wiring layer, and the other thereof electrically connects the second metal wiring layer to a rear end of the third metal wiring layer; and
a plurality of display units, each of which electrically connects to the corresponding data line and the corresponding scan line.

6. The liquid crystal panel according to claim 5, wherein each of the transparent conductive lines comprises: an inner portion away from the corresponding data line, and an outer portion close to the corresponding data line.

7. The liquid crystal panel according to claim 6, wherein the liquid crystal panel further comprises: a first insulating layer formed on the second metal wiring layer, a lower through hole formed in the first insulating layer and connected the second metal wiring layer to the outer portion of the transparent conductive line, a second insulating layer formed on the first insulating layer and covered on the transparent conductive lines, and an upper through hole formed in the second insulating layer and connected the inner portion of the transparent conductive line to the third metal wiring layer.

8. The liquid crystal panel according to claim 5, wherein the first and third metal wiring layers are made of the same metal, and the second metal wiring layer is made of a metal different therefrom.

9. The liquid crystal panel according to claim 8, wherein the first, second, and third metal wiring layers are selected respectively from chromium (Cr), molybdenum (Mo) or Cr—Mo alloys.

10. A liquid crystal panel, comprising:
a plurality of data lines, each of which has a first metal wiring layer;
a plurality of scan lines vertically interlaced with the data lines, each of the scan lines comprising: a second metal wiring layer interlaced with the first metal wiring layer, a third metal wiring layer located above the second metal wiring layer, and a single transparent conductive line located between the second metal wiring layer and the third metal wiring layer, wherein an end of the transparent conductive line electrically connects the second metal wiring layer to a front end of the third metal wiring layer, and the other end of the transparent conductive line electrically connects the second metal wiring layer to a rear end of the third metal wiring layer; and
a plurality of display units, each of which electrically connects to the corresponding data line and the corresponding scan line.

11. The liquid crystal panel according to claim 10, wherein a length of the transparent conductive line is greater than that of the third metal wiring layer.

12. The liquid crystal panel according to claim 10, wherein the transparent conductive line has a front portion and a rear portion, the front portion and the rear portion are close to two of the adjacent data lines, respectively, each of the front portion and the rear portion forms an upper through hole and a lower through hole, respectively, the upper through hole electrically connects to the third metal wiring layer, and the lower through hole electrically connects to the second metal wiring layer.

13. The liquid crystal panel according to claim 12, wherein the liquid crystal panel further comprises: a first insulating layer formed on the second metal wiring layer; a pair of lower through holes formed in the first insulating layer and connected the second metal wiring layer to the front portion and the rear portion of the transparent conductive line, respectively; a second insulating layer formed on the first insulating layer and covered on the transparent conductive lines; and a pair of upper through holes formed in the second insulating layer and connected the front portion and the rear portion of the transparent conductive line to the third metal wiring layer, respectively.

14. The liquid crystal panel according to claim 10, wherein the first and third metal wiring layers are made of the same metal, and the second metal wiring layer is made of a metal different therefrom.

* * * * *

UNITED STATES PATENT AND TRADEMARK OFFICE
CERTIFICATE OF CORRECTION

| | | |
|---|---|---|
| PATENT NO. | : 9,146,436 B2 | Page 1 of 1 |
| APPLICATION NO. | : 14/234394 | |
| DATED | : September 29, 2015 | |
| INVENTOR(S) | : Bing Han and Jin Jie Wang | |

It is certified that error appears in the above-identified patent and that said Letters Patent is hereby corrected as shown below:

On the Title Page, Insert

Item --(30) Foreign Application Priority Data

Dec 27, 2013 (CN) …………..201310738974.5--

Signed and Sealed this
Twenty-fourth Day of May, 2016

Michelle K. Lee
*Director of the United States Patent and Trademark Office*